United States Patent [19]

Worrell et al.

[11] Patent Number: 5,762,365
[45] Date of Patent: Jun. 9, 1998

[54] AIR BAG COVER ASSEMBLY

[75] Inventors: Barry Christian Worrell, Centerville; John Charles Weber, Springboro, both of Ohio

[73] Assignee: General Motors Corporation, Detroit, Mich.

[21] Appl. No.: 798,736

[22] Filed: Feb. 13, 1997

[51] Int. Cl.[6] .................................................. B60R 21/16
[52] U.S. Cl. ................................... 280/731; 200/61.54
[58] Field of Search ........................... 280/731, 728.1, 280/728.3; 200/61.54, 61.55

[56] References Cited

U.S. PATENT DOCUMENTS

| 4,934,735 | 6/1990 | Embach | 280/731 |
|---|---|---|---|
| 5,002,306 | 3/1991 | Hiramitsu et al. | 280/731 |
| 5,338,059 | 8/1994 | Inoue et al. | 280/728.2 |
| 5,369,232 | 11/1994 | Leonelli | 206/61.54 |
| 5,484,561 | 1/1996 | Weber et al. | 264/46.4 |
| 5,575,498 | 11/1996 | Elgadah et al. | 280/731 |
| 5,577,766 | 11/1996 | Niwa et al. | 280/731 |
| 5,585,606 | 12/1996 | Ricks | 280/731 |
| 5,630,617 | 5/1997 | Hashiba | 200/61.54 X |
| 5,647,610 | 7/1997 | Nagata | 280/731 |

FOREIGN PATENT DOCUMENTS

| 4063764 | 2/1992 | Japan | 280/731 |

*Primary Examiner*—Christopher P. Ellis
*Attorney, Agent, or Firm*—Kathryn A. Marra

[57] ABSTRACT

An air bag cover assembly includes a cover having a plurality of mounting posts extending downwardly from the cover and a gasket attached to the mounting posts. The air bag cover assembly further includes a reaction plate captured between the cover and the gasket and a membrane horn switch captured between the reaction plate and the cover. Thus, attachment of the gasket to the mounting posts securely attaches the reaction plate and the membrane horn switch to the cover during air bag deployment. Preferably, the mounting posts and the gaskets are integrally fused together by heat welding.

23 Claims, 3 Drawing Sheets

AIR BAG COVER ASSEMBLY

This invention relates generally to an air bag cover assembly including a membrane horn switch.

BACKGROUND OF THE INVENTION

It is well known in motor vehicles to provide an air bag module mounted to a steering wheel. The air bag module typically includes an inflator for generating gas to inflate an air bag for restraining an occupant. The air bag module also typically includes an air bag cover which houses the air bag and inflator. The cover includes breakable tear seams which open upon air bag deployment.

It is known to provide an air bag cover and to mount membrane horn switches beneath the cover. These membrane horn switches conventionally comprise two very thin sheets having conductive coatings which are normally separated by thin spacers. Pressure on the switch presses the conductive surfaces together to close a circuit and actuate a horn. Typical membrane horn switches are less than one millimeter in thickness. To actuate the horn, the driver must sufficiently compress the cover to apply pressure to the membrane horn switch for actuating the horn.

It is also known in the prior art to provide a reaction plate mounted to the air bag cover. The membrane horn switch is captured between the reaction plate and the cover. When the cover is compressed, the reaction plate provides a solid surface against which the membrane horn switch can be compressed to actuate the horn. The cover includes a plurality of mounting posts which extend through aligned apertures in both the membrane horn switch and reaction plate. The ends of the posts are melted to heat stake the reaction plate to the cover. Only the material of the melted ends of the posts secures the reaction plate and membrane horn switch to the cover. The membrane horn switch must withstand the heat of the reaction plate and the mounting posts during the heat staking process. Also, hot air from the heat staking process may seep through apertures in the reaction plate and must be withstood by the membrane horn switch. In addition, the reaction plate must be made of a material which is much stiffer and has a higher flex modulus than the cover which must be flexible and resilient to enable blowing of the horn. These requirements lead to the reaction plate and the mounting posts having differing material requirements so that an integral material bond is not formed during heat welding.

SUMMARY OF THE INVENTION

The present invention preferably provides advantages and alternatives over the prior art by protecting the membrane horn switch from heat associated with a heat welding process during assembly. The present invention preferably provides a membrane horn switch which is protected from the heat associated with melting of the mounting post during assembly. Advantageously, structure is preferably provided which reduces or eliminates the flow of hot air through the reaction plate and onto the membrane horn switch during the heat welding process. Also advantageously, the mounting post is not just melted, but is preferably fused with material from a gasket to provide a strong bond which keeps the mounting post, reaction plate and membrane horn switch securely attached to the air bag cover during inflation.

These advantages are preferably accomplished in the present invention by providing an air bag cover assembly including a cover having at least one mounting post extending downwardly from the cover and a gasket attached to the mounting post. The air bag cover assembly further includes a reaction plate captured between the cover and the gasket and a membrane horn switch captured between the reaction plate and the cover. Thus, attachment of the gasket to the mounting post securely attaches the reaction plate and the membrane horn switch to the cover during air bag deployment.

Preferably, the mounting post and the gasket are integrally fused together by heat welding. Also preferably, the gasket includes at least one gasket aperture for receiving the mounting post therethrough. The gasket preferably includes a downwardly projecting weld flange surrounding each gasket aperture and the weld flange is attached to the mounting post. The weld flange is preferably integrally fused with the mounting post by heat welding to provide an integral connection between the weld flange and the mounting post. It is preferred that the weld flange and mounting post engage each other with a tight interference fit connection prior to heat welding such that the weld flange protects the membrane horn switch from heat during heat welding of the gasket to the mounting post.

In accordance with other preferred aspects of the invention, the reaction plate, gasket, and mounting post are each made of a thermoplastic material. Preferably, the thermoplastic materials of the gasket and the mounting post each have a flex modulus approximately equal to each other. It is preferred that the thermoplastic materials of the gasket and the mounting post each have a flex modulus which is lower than the flex modulus of the thermoplastic material of the reaction plate such that the membrane horn switch is protected by the reaction plate when the mounting post and gasket are heat welded together. Also preferably, the reaction plate is made of a polycarbonate material and the gasket is made of the same material as that of the mounting post. The mounting post is preferably integrally formed with the cover and the cover is preferably made of a thermoplastic material.

In accordance with further preferred aspects, the mounting post extends through the membrane horn switch, reaction plate, and gasket and the mounting post includes an end portion extending outwardly from the gasket and the end portion is heat welded to the gasket. The mounting post preferably includes a base portion having a height and the base portion includes a base shoulder portion and the membrane horn switch engages the base shoulder portion and is captured between the base shoulder portion and the reaction plate such that the membrane horn switch is spaced from the cover by a distance equal to the height of the base portion of the mounting post.

BRIEF DESCRIPTION OF THE DRAWINGS

The present invention is described below, by way of example, with reference to the accompanying drawings in which.

DESCRIPTION OF THE PREFERRED EMBODIMENT

Figure 1:
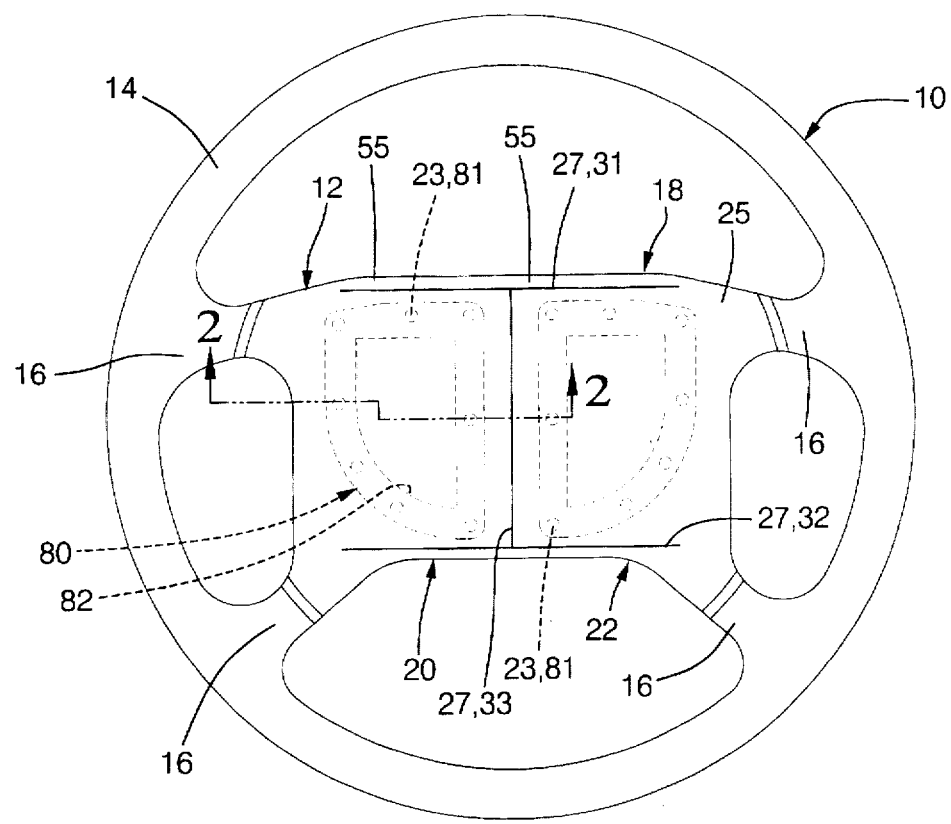
FIG. 1 is a plan view of a steering wheel and an air bag cover assembly according to the present invention.

Referring to FIG. 1, a vehicle steering wheel 10 includes a central hub portion 12, a generally circular outer rim portion 14, and a plurality of spokes 16 extending between the hub portion 12 and the rim portion 14. An air bag module 18 is mounted on the hub portion 12 of the steering wheel 10. The air bag module 18 includes an air bag (not shown) and an inflator (not shown) for generating gas to inflate the air bag. The air bag module 18 also includes an air bag cover assembly, generally designated as 20. The air bag cover assembly 20 includes a cover 22, membrane horn switches 30, reaction plates 40, and gaskets 80, described in detail hereinafter.

Figure 2:
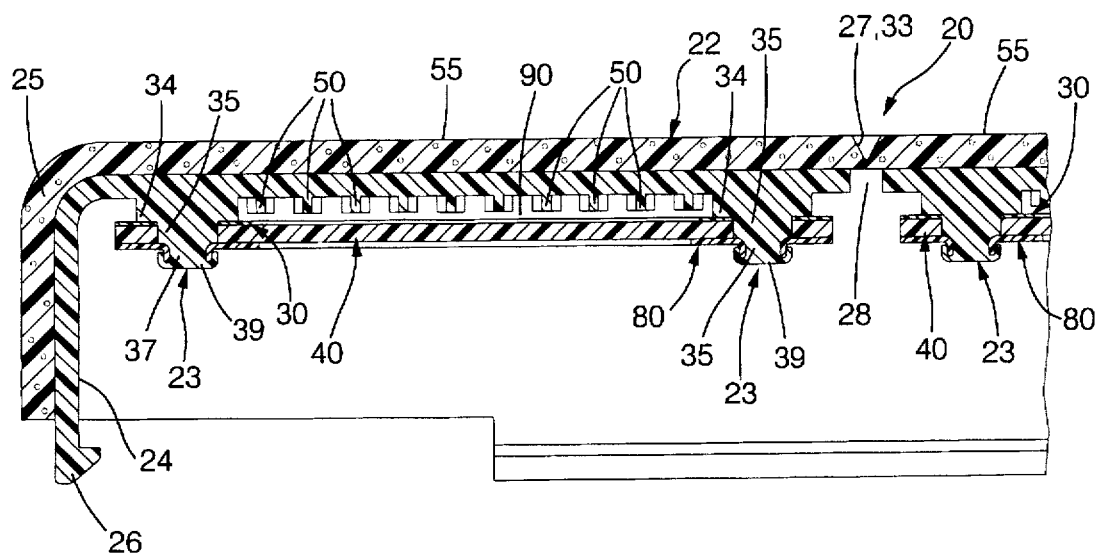
FIG. 2 is a sectional view taken along line 2—2 of FIG. 1.

As best shown in FIG. 2, the cover 22 includes an inner cover substrate 24 forming an inner layer of the cover 22. Preferably, the cover substrate 24 is a plastic material, preferably being a resilient thermoplastic material which is easily compressed to actuate the horn, as described further hereinafter. The cover 22 may also include a decorative outer layer 25 made of a plastic material, preferably being a soft urethane foam or a thermoplastic rubber which adheres to the thermoplastic material of the cover substrate 24 to form the cover 22 as one unitary cover 22 handled as a single component during assembly. The cover 22 is preferably cup-shaped for housing the air bag and inflator therein. As shown in FIG. 2, the cover substrate 24 preferably includes downwardly extending hooks 26 spaced around its perimeter for attaching the air bag cover assembly 20 to a base (not shown) of the air bag module 18.

As best shown in FIG. 1, the outer layer 25 of the cover 22 preferably includes superficial grooves 27 in an "T"-shaped pattern and underlying slots on the cover substrate 24, such as a central slot 28, which cooperatively provide weakened I-shaped tear seams 31, 32, 33 along which the cover 22 is forcibly opened by deployment of the air bag upon discharge of gas by the inflator. While the tear seams 31, 32, 33 are shown in an I-shaped pattern, it will be appreciated that the tear seams 31, 32, 33 could have many other shapes that are convenient for deployment of the air bag, such as a C-shape.

Figure 3A:
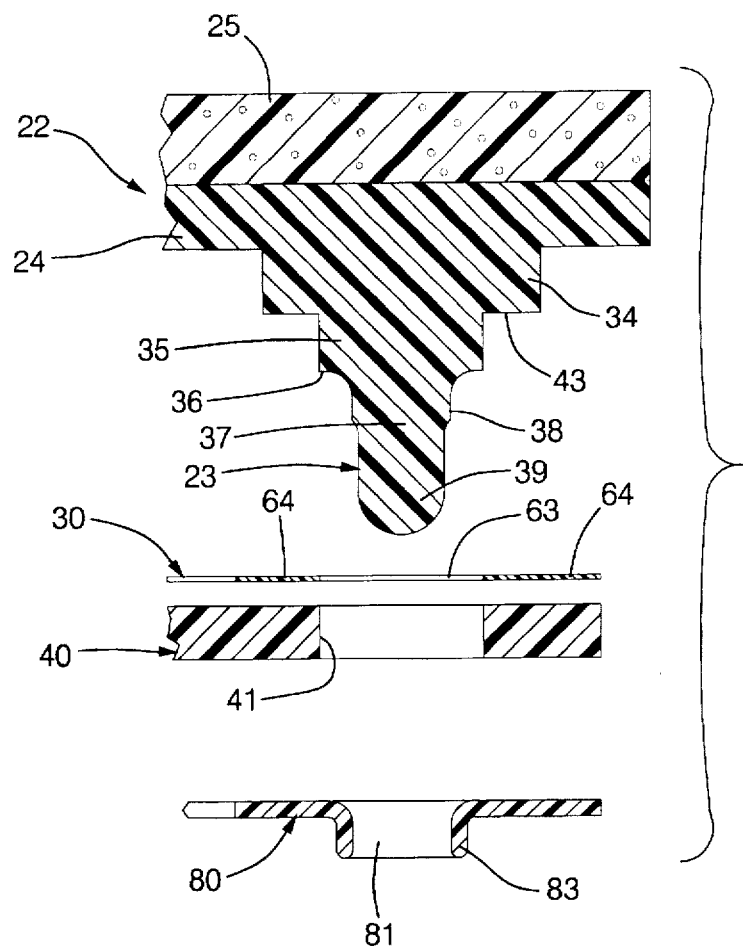
FIG. 3A is an exploded sectional view of the air bag cover assembly partially broken away and showing a gasket, a membrane horn switch and a reaction plate prior to attachment to the air bag cover.

As best shown in FIG. 2, the air bag cover assembly 20 includes membrane horn switches 30 mounted beneath the cover 22. The membrane horn switches 30 are each generally located on opposing sides of the central tear seam 33. The membrane horn switches 30 may be separate or may be connected to each other to form a single membrane horn switch. The membrane horn switches 30 are connected to electrical wires (not shown) which extend out from at least one of the membrane horn switches 30 and provide connection to a horn (not shown). The very thin membrane horn switches 30 may be of any conventional construction and are shown schematically as a solid plastic material. The membrane horn switches 30 may be comprised of two thin sheets having conductive coatings thereon separated by thin spacers. Upon the application of pressure to the membrane horn switches 30, the conductive surfaces are brought together to close a circuit and actuate a horn. The membrane horn switches 30 are very thin, preferably being less than a millimeter in thickness. The membrane horn switches 30 include film edges 64 around the perimeters which are preferably not conductive such that they do not activate the horn when pressed for attachment to the cover 22 during assembly. As best shown in FIG. 3A, the membrane horn switches 30 include membrane horn switch apertures 63 spaced apart around the edges 64 of the perimeter which are aligned for receiving corresponding mounting posts 23 of the cover 22 therethrough for attachment of the membrane horn switches 30 to the cover 22, as described further hereinafter It will be appreciated that the air bag cover assembly 20 is preferably mirrored about the central tear seam 33. As best shown in FIGS. 1 and 2, the cover 22 generally includes two halves 55 which are located on opposing sides of the central tear seam 33. As best shown in FIGS. 1 and 2, the cover substrate 24 includes a plurality of outwardly projecting mounting posts 23 which project downward towards the membrane horn switches 30. The mounting posts 23 are preferably integrally formed with the thermoplastic material of the cover substrate 24 which softens when heated and hardens when cooled. Most preferably, the cover substrate 24 and the mounting posts 23 are made of a thermoplastic material having a softening temperature and a flex modulus which are similar to that of the gaskets 80 for better integral fusion together during heat welding. Preferably, the thermoplastic materials of the cover substrate 24, mounting posts 23 and gaskets 80 have a typical softening temperature of about 85 degrees C. and a typical flex modulus of about 45,000 psi at 22 degrees C. Most preferably, the flex moduli and stiffness of the mounting posts 23 and gaskets 80 are lower than that of the reaction plates 40. Also, it is preferred that the softening temperatures of the mounting posts 23 and gaskets 80 are lower than that of the reaction plates 40. The mounting posts 23 are preferably spaced apart around the edges of each of the halves 55 of the cover 22 in alignment with the membrane horn switch apertures 63, as best shown in FIG. 1. It will be appreciated that the mounting posts 23 may vary in size and number depending on the desired strength to hold the reaction plate 40 onto the cover substrate 24, as described further hereinafter.

Figure 3B:
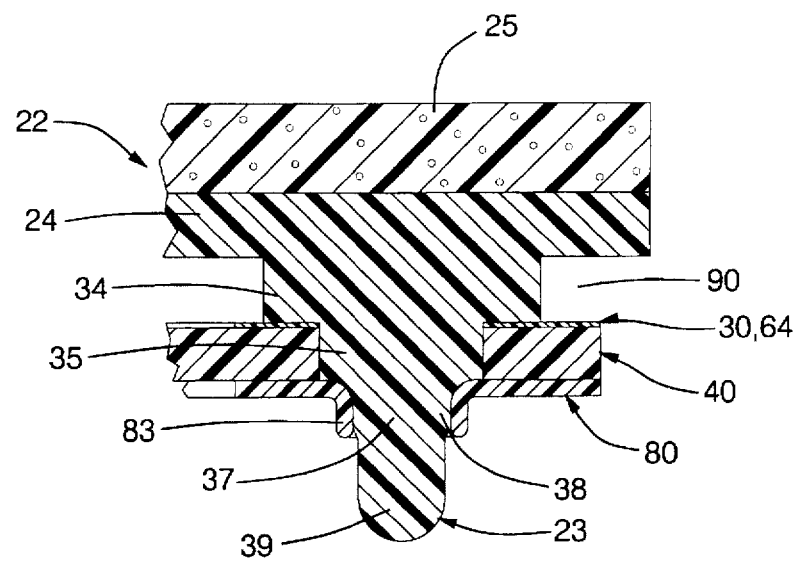
FIG. 3B is a sectional view similar to FIG. 3A, but showing the membrane horn switch, gasket and reaction plate assembled to the air bag cover prior to heat welding.
Figure 3C:
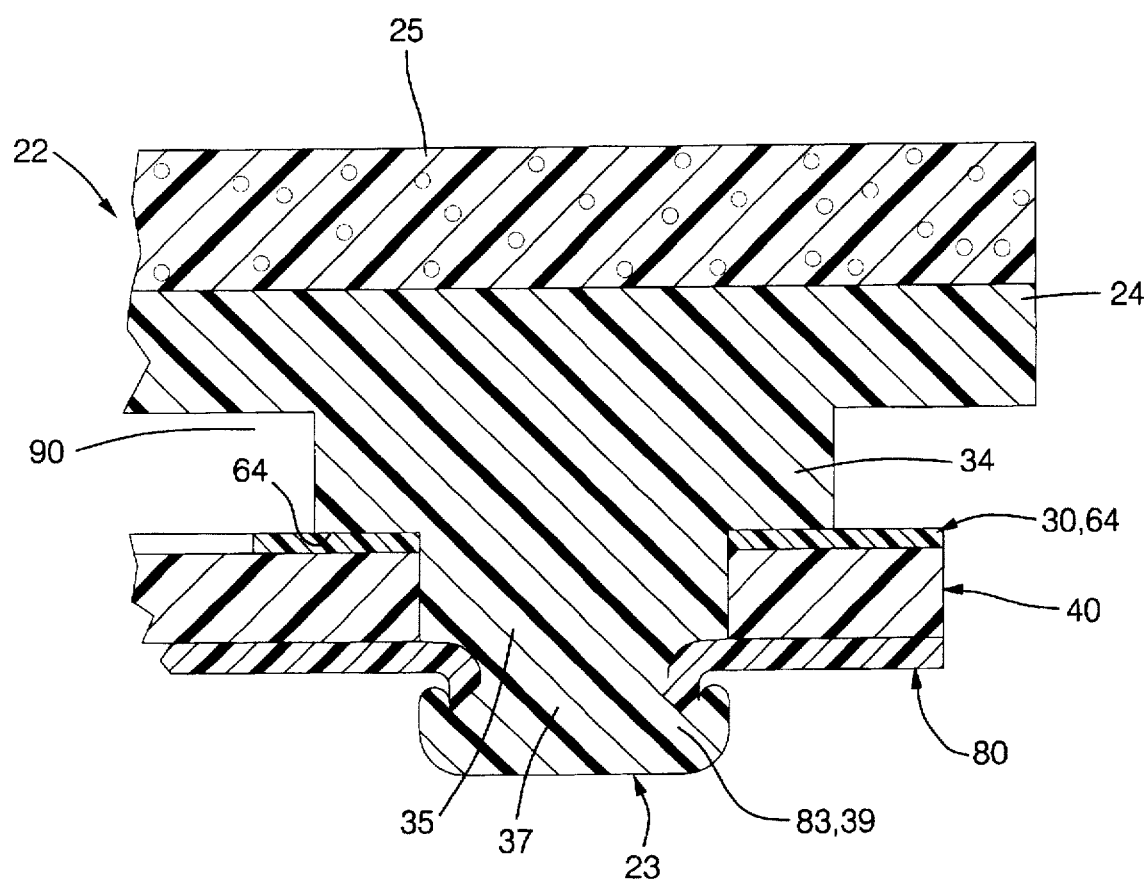
FIG. 3C is a sectional view similar to FIG. 3B, but showing the gasket integrally fused to the air bag cover after heat welding.

Each of the mounting posts 23 preferably have a generally similar structure prior to assembly, as best shown in an enlarged view in FIG. 3A. The mounting posts 23 each include an upper base portion 34 directly adjacent the cover substrate 24. The base portions 34 each include a base shoulder portion 43 against which the membrane horn switches 30 and the reaction plate 40 are mounted. The base shoulder portions 43 are sized larger than the reaction plate apertures 41 and the membrane horn switch apertures 63. The base portions 34 including the base shoulder portions 35 keep the membrane horn switches 30 spaced apart from the cover substrate 24 by a predetermined distance equal to the height of the base portions 34. Thus, as best shown in FIGS. 2, 3B and 3C, a gap 90 is maintained between the membrane horn switches 30 and the cover substrate 24. Thus, the membrane horn switches 30 are normally separated from the cover 22 by the gap 90 until the cover 22 is compressed to press on at least one of the membrane horn switches 30 to activate the horn.

The mounting posts 23 each further include a central portion 35 which has a diameter less than the base portion 34. The central portions 35 are sized for closely engaging the reaction plate apertures 41 when the reaction plates 40 are pressed onto the mounting posts 23, as best shown in FIG. 3B. The central portions 35 preferably have a height about equal to the depth of the reaction plates 40. Thus, the reaction plates 40 securely surround the central portions 35 of the mounting posts 23 in the assembled condition. The reaction plates 40 also trap the membrane horn switches 30 between the reaction plates 40 and the cover 22. The central portions 35 may also include a central shoulder portion 36 projecting radially outward. The central shoulder portion 36 engages the gasket 80 when the gasket 80 is assembled to the cover 22, as best shown in FIG. 3B. The central portions 35 of the mounting posts 23 each are preferably sized about equal to or slightly larger than the gasket apertures 81, as described further below.

As best shown in FIG. 3A, the mounting posts 23 each include a fusing portion 37 which projects downwardly from the central portion 35 and preferably includes a thickened portion 38 adjacent the central portion 35 and axially inward of a lowermost free end portion 39 of the mounting post 23. The fusing portions 37 have diameters which are less than the diameters of the central portions 35. The thickened portions 38 of the fusing portions 37 preferably have slightly increased diameters which are sized for an interference press fit with the gasket apertures 81. The thickened portions 38 preferably have heights approximately equal to the heights of the weld flanges 83 on the gaskets 80, as described further below. This press fit between the thickened portions 38 and the weld flanges 83 preferably prevents hot air from seeping through the weld gasket 80 and onto the reaction plates 40 and membrane horn switches 30 during heat welding, as described further below. The thickened portions 38 and the free end portions 39 may be continuously tapered for an easier press-fit with the weld gasket 80. The fusing portions 37 are initially undeformed during assembly as shown in FIGS. 3A and 3B and then are deformed by the application of heat, as shown in FIGS. 2 and 3C for integral connection to the weld gasket 80, as described below.

As shown in FIG. 2, the cover substrate 24 further preferably includes a plurality of projections 50 which are preferably evenly spaced apart around on the entire halves 55 of the cover substrate 24 for loading the membrane horn switches 30 when either of the halves 55 of the cover 22 are compressed. The projections 50 preferably have a height which is less then the gap 90 such that the gap 90 is normally not completely closed by the projections 50 when the cover 22 is in an uncompressed condition as shown in FIG. 2. Thus, the projections 50 are normally spaced apart above the membrane horn switches 30 and do not touch the membrane horn switches 30 when the cover 22 is not compressed. The projections 50 concentrate the load on the membrane horn switches 30 when the cover 22 is moved to a compressed condition for positive activation of the horn. The projections 50 preferably are X-shaped, although the projections 50 may be many other shapes.

Referring to FIGS. 2 and 3A, the air bag cover assembly 20 further includes reaction plates 40 located on each of the cover halves 55 for capturing the membrane horn switches 30 on the cover 22. The reaction plates 40 are preferably planar and are shaped to overlie the membrane horn switches 30. The reaction plates 40 are preferably made of a plastic material being sufficiently stiff to serve as a reaction surface when pressure is applied to any location on either of the membrane horn switches 30. The reaction plates 40 are most preferably made of a relatively stiff, thermoplastic material which is most preferably a polycarbonate material having a higher softening temperature and a higher stiffness and flex modulus than that of the weld gaskets 80 and mounting posts 23. The reaction plates 40 each preferably have a shape which generally matches the shape of the membrane horn switches 30 and the cover halves 55. The reaction plates 40 preferably each include a plurality of reaction plate apertures 42 aligned for receiving the mounting posts 23 of the cover substrate 24 therethrough. The reaction plate apertures 41 are sized for closely receiving the central portions 35 of the mounting posts 23 therein.

The air bag cover assembly 20 includes weld gaskets 80, as shown in FIGS. 1–3C. The weld gaskets 80 are preferably planar and are relatively thin and flexible, preferably being thinner than the reaction plates 40. The weld gaskets 80 are preferably made of a plastic material, most preferably being a thermoplastic material being soft when heated and hard when cooled, for example such as a thermoplastic olefin (TPO). The weld gaskets 80 preferably have a lower softening temperature and flex modulus than the reaction plates 40. However, the weld gaskets 80 preferably have a softening temperature and flex modulus approximately the same as that of the mounting posts 23 for better integral fusing during heat welding. Preferably, the gaskets 80 have a typical flex modulus of about 45,000 psi at 22 degrees C. As best shown in FIGS. 1 and 2, the weld gaskets 80 each include central opening 82 positioned generally between the mounting posts 23. The central opening 82 provides flexibility of the weld gaskets 80 during assembly. The shape of the weld gaskets 80 generally follows the shape of the reaction plates 40 and membrane horn switches 30 and overlies the location of the mounting posts 23. It will also be appreciated that the central opening 82 saves unnecessary material from being used that is not in the area of the mounting posts 23. However, it will be appreciated that additional material may be included in the central openings 82 of the weld gaskets 80 to correspond with additional mounting posts 23, if desired. The weld gaskets 80 further include gasket apertures 81 spaced for alignment with the corresponding reaction plate apertures 41, membrane horn switch apertures 63 and mounting posts 23. As best shown in FIGS. 3A and 3B, the weld gaskets 80 preferably include weld flanges 83 surrounding each of the gasket apertures 81. The weld flanges 83 preferably extend generally downward from the weld gaskets 80. The gasket apertures 81 and the corresponding weld flanges 83 are sized for closely receiving the fusing portions 37 of the mounting posts 23 therein during assembly preferably by press-fit or interference-fit connection with the thickened portions 38. The weld flanges 83 advantageously provide increased material contact with the mounting posts 23 which enables a stronger bond to be formed when the weld gaskets 80 are heat welded to the mounting posts 23. The weld gaskets 80 protect the membrane horn switches 30 from heat associated with the heat welding process during assembly, as described further below.

The air bag cover assembly 20 is preferably assembled as follows with reference to FIGS. 2 and 3A–3C. FIG. 3A shows an 30 exemplary enlargement of one of the mounting post 23 locations on the cover 22. The cover 22 is provided with the cover substrate 24 having the mounting posts 23 and the projections 50 preferably integrally molded therein. The fusing portions 37 of the mounting posts 23 are initially in an undeformed condition. The membrane horn switch apertures 63 of the membrane horn switches are aligned with the corresponding mounting posts 23. Referring to FIGS. 3A and 3B, the mounting posts 23 are inserted through the membrane horn switch apertures 63, such that the membrane horn switches 30 have edges 64 resting against the base shoulder portions 43 of the base portions 34. The reaction plate apertures 41 of the reaction plates 40 and the gasket apertures 81 of the weld gaskets 80 are aligned with the membrane horn switch apertures 63 and the corresponding mounting posts 23. It will be appreciated that the reaction plates 40 and the weld gaskets 80 may optionally be connected together by an adhesive bond, such as tape (not shown), prior to attachment to the cover 22 so that they can be handled as a single component during assembly.

Next, the mounting posts 23 are inserted through the reaction plate apertures 41 and the reaction plates 40 are pushed onto the mounting posts 23 around the central portions 35 until the reaction plates 40 rest on the base shoulder portions 43 of the mounting posts 23. The reaction plate openings 41 are sized for closely receiving the central portions 35 of the mounting posts 23 therein, preferably by a slight interference fit. The reaction plates 40 capture the membrane horn switches 30 between the cover 22 and the base portions 34 of the mounting posts 23. Thus, the membrane horn switches 30 are spaced below the cover 22 by an amount equal to the height of the base portions 34 of the mounting posts 23 to form the gap 90 as best shown in FIGS. 2 and 3B. It will be appreciated that in the assembled condition as best shown in FIG. 2, the membrane horn switches 30 do not engage the projections 50 since the projections 50 have a height less than the height of the base portions 34 of the mounting posts 23. Finally as best shown in FIG. 3B, the weld gaskets 80 are pressed onto the fusing portions 37 of the mounting posts 23 until the weld gaskets 80 engage the central shoulder portions 36. The weld gaskets 80 are also pressed onto the fusing portions 37 to preferably provide a press-fit or an interference fit connection with the thickened portions 38, as best shown in FIG. 3B.

Referring to FIG. 3B, it will be appreciated that the cover assembly 20 is in an assembled condition held together by press-fit of the components. However, the assembly 20 as shown in FIG. 3B is not sufficiently strong to withstand the forces of air bag inflation. It will be appreciated that the reaction plates 40 capture the membrane horn switches 30 in position between the reaction plates 40 and the cover 22. I will further be appreciated that the membrane horn switches 30, reaction plates 40, and weld gaskets 80 directly engage each other in the assembled condition. However, the membrane horn switches 30 are not activated by this attachment, since the conductive layers are inset from the edges 64 so as not to activate the horn when pressed during assembly. The reaction plates 40 are captured between the membrane horn switches 30 and the weld gaskets 80 by the weld gaskets 80. It will be appreciated that the weld gaskets 80 including the weld flanges 83 along with the reaction plates 40 provide a protective barrier between the fusing portions 37 of the mounting posts 23 and the membrane horn switches 30.

Referring to FIG. 3C, the material of the weld gaskets 80 is integrally fused into a single material with the material of the fusing portions 37 of the mounting posts 23 to simultaneously securely attach the weld gaskets 80, reaction plates 40 and membrane horn switches 30 to the cover 22. This is accomplished by heating the end portions 39 and the fusing portions 37 of the mounting posts 23 and the weld flanges 83 such that the mounting posts 23 and the weld gaskets 80 are fused together as one integral material as shown in FIGS. 2 and 3. This is accomplished by heat welding, such as by the use of hot air. Preferably, the thermoplastic material of the weld gaskets 80 and the mounting posts 23 have similar flex moduli such that the cooled materials form a strong integral bond after heat welding. During the heat welding process, the free end portions 39 and of the mounting posts 23 are melted and fused to the weld flanges 83 of the weld gaskets 80 to form an integral connection between the weld gaskets 80 and the mounting posts 23. The integrally connected material becomes hard as it cools and provides a strong connection between the cover 22 and the weld gaskets 80 as further enabled by the connection along the weld flanges 83 in addition to the similar flex moduli. The integral connection between the weld gaskets 80 and the fusing portions 37 including the end portions 39 of the mounting posts 23 securely anchors and captures the reaction plates 40 and the membrane horn switches 30 to the cover 22.

Advantageously, the membrane horn switches 30 are protected from the heat of the heat welding process, as will now be described. The weld gaskets 80 and the mounting posts 23 preferably have flex moduli which are approximately equal and also preferably softening temperatures which are similar. However, the gaskets 80 and mounting posts 23 preferably have a lower flex modulus and softening temperature than the reaction plates 40, such that the weld gaskets 80 and the mounting posts 23 are preferably fused together without substantially melting the reaction plates 40. The weld gaskets 80 can have a flex modulus and stiffness similar to that of the flexible cover 22, unlike the stiffer reactions plates 40 requiring a higher flex modulus. The reaction plates 40 act as a protective layer between the weld gaskets 80 and the membrane horn switches 30 to protect the membrane horn switches 30 from being heated during the heat welding process. Also advantageously, the snug press-fit between the weld flanges 83 and the fusing portions 37 of the mounting posts 23 and also between the reaction plate apertures 41 and the central portions 35 of the mounting posts 23 reduces or prevents hot air from leaking through the gasket apertures 81 and reaction plate apertures 41 to further protect the membrane horn switches 30 from the heat during assembly. Also advantageously, the use of the weld flanges 83 provides a strong integral connection with the mounting posts 23 that provides additional intimate contact with the fusing portions 37 of the mounting posts 23 over a larger area for a stronger integral connection which is maintained during air bag deployment. Also advantageously, the gaskets 80 and the mounting posts 23 having similar flex moduli ensure a strong integral connection of the materials during heat welding.

Upon air bag deployment, the deploying air bag breaks open the cover 22 along the "T"-shaped tear seams 31, 32, 33. The cover 22 opens and each of the membrane horn switches 30, reaction plates 40 and weld gaskets 80 remains securely attached to their respective halves 55 of the cover 22 during air bag inflation as enabled by the integral connection of the mounting posts 23 to the weld gaskets 80.

Referring to FIG. 2, to activate the horn, the cover 22 including the outer layer 25 and the cover substrate 24 are pressed. When the cover 22 is compressed downward, the projections 50 come into contact with and apply pressure on at least one of the membrane horn switches 30. Pressure on the membrane horn switches 30 presses the conductive surfaces together to close a circuit and actuate a horn (not shown). Advantageously, the projections 50 concentrate the force on the membrane horn switches 30 when the cover 22 is compressed to provide positive activation of the horn.

It will be understood that a person skilled in the art may make modifications to the embodiments shown herein within the scope and intent of the claims. For example, although preferred embodiment shows two membrane horn switches 30, two weld gaskets 80 and two reaction plates 40, it will be appreciated that alternately one or more than two membrane horn switches 30, weld gaskets 80 and reaction plates 40 could be used. It will further be appreciated that every mounting post 23 need not be fused to the weld gasket 80 or have the identical configuration as long as there if a sufficient number to keep the weld gaskets 80, reaction plates 40 and membrane horn switches 30 securely anchored during air bag deployment. It will further be appreciated that while the existence of the weld flanges 83 is preferred, the weld flanges 83 could be eliminated and the planar weld gaskets 80 could be directly fused to the mounting posts 23 at the gasket apertures 81. While the mounting posts 23 preferably include thickened portions 38, these could be eliminated and a slip-fit connection could be used to assemble the weld gaskets 80 to the mounting posts 23. Instead of having thickened portions 38, it will be appreciated that the entire axial length of the fusing portions 37 of the mounting posts 23 could be tapered for a press fit with the weld gaskets 80. It will further be appreciated that while the preferred embodiment is shown as having a plurality of mounting posts 23, it will be appreciated that at least one mounting post 23 must be used. For example, a single mounting post 23 could project around the perimeter of the cover 22. It will further be appreciated that the mounting posts 23 need not be at a single connection point, but could extend in a line or circle on the cover substrate 24.

While the present invention has been described as carried out in a specific embodiment thereof, it is not intended to be limited thereby but is intended to cover the invention broadly within the scope and spirit of the appended claims.

What is claimed is:

1. An air bag cover assembly comprising:
   a cover including at least one mounting post extending downwardly therefrom;
   a gasket attached to the mounting post;
   a reaction plate captured between the cover and the gasket;
   a membrane horn switch captured between the reaction plate and the cover; and
   the gasket and mounting post being adapted for deformation and integral connection to each other to cooperatively secure the reaction plate and the membrane horn switch to the cover.

2. The air bag cover assembly of claim 1 wherein the mounting post and the gasket are integrally fused together by heat welding.

3. The air bag cover assembly of claim 1 wherein the gasket includes a gasket aperture for receiving the mounting post therethrough.

4. The air bag cover assembly of claim 3 wherein the gasket includes a downwardly projecting weld flange surrounding the gasket aperture and wherein the weld flange is attached to the mounting post.

5. The air bag cover assembly of 4 wherein the weld flange is integrally fused with the mounting post by heat welding to provided an integral connection between the weld flange and the mounting post.

6. The air bag cover assembly of claim 5 wherein the weld flange and mounting post engage with a tight interference fit connection prior to heat welding and wherein the weld flange protects the membrane horn switch from heat during heat welding of the gasket to the mounting post.

7. The air bag assembly of claim 5 wherein the mounting post includes a thickened portion for an interference-fit connection with the weld flange prior to heat welding.

8. The air bag cover assembly of claim 1 wherein the reaction plate, gasket, and mounting post are each made of a thermoplastic material.

9. The air bag cover assembly of claim 8 wherein the thermoplastic materials of the gasket and the mounting post each have a softening temperature which is lower than the softening temperature of the thermoplastic material of the reaction plate.

10. The air bag cover assembly of claim 8 wherein the thermoplastic materials of the gasket and the mounting post each have a flex modulus lower than that of the thermoplastic material of the reaction plate.

11. The air bag cover assembly of claim 1 wherein the mounting post extends through the membrane horn switch, reaction plate, and gasket and wherein the mounting post includes an end portion extending outwardly from the gasket and wherein the end portion is heat welded to the gasket.

12. The air bag cover assembly of claim 1 wherein the mounting post includes a base portion having a height and wherein the base portion includes a base shoulder portion and wherein the membrane horn switch engages the base shoulder portion and is captured between the base shoulder portion and the reaction plate and wherein the membrane horn switch is spaced from the cover by a distance equal to the height of the base portion of the mounting post.

13. The air bag cover assembly of claim 12 wherein the cover includes at least one projection extending downwardly from the cover and spaced above the membrane horn switch when the cover is in an uncompressed condition and wherein the projection has a height less than the height of the base portion whereby the projection concentrates load on the membrane horn switch when the cover is moved to a compressed condition.

14. The air bag cover assembly of claim 1 wherein the mounting post is integrally formed with the cover.

15. The air bag cover assembly of claim 14 wherein the cover is made of a thermoplastic material.

16. The air bag cover assembly of claim 1 wherein the cover includes an inner cover substrate formed of thermoplastic material and integrally formed with the mounting post and wherein the cover includes a decorative outer layer overlying the cover substrate.

17. The air bag cover assembly of claim 1 wherein the gasket is thin and flexible and wherein the reaction plate is relatively stiff to provide a reaction surface against which the membrane horn switch can be pressed.

18. The air bag cover assembly of claim 1 wherein the gasket has a flex modulus lower than that of the reaction plate.

19. The air bag cover assembly of claim 1 wherein the gasket includes a central opening.

20. The air bag cover assembly of claim 1 wherein the membrane horn switch, reaction plate and gasket directly engage each other and are vertically spaced beneath the cover when the cover is in an uncompressed condition.

21. The air bag cover assembly of claim 1 wherein the reaction plate is made of a polycarbonate material.

22. The air bag cover assembly of claim 1 wherein the gasket and the mounting posts are each made of a thermoplastic material and wherein the thermoplastic materials of the gasket and the mounting posts have flex moduli which are about equal.

23. The air bag cover assembly of claim 1 wherein the gasket and the mounting posts are each made of a thermoplastic material and wherein the thermoplastic materials of the gasket and the mounting posts have flex moduli and softening temperatures which are about equal.

* * * * *